United States Patent [19]

Olson et al.

[11] Patent Number: 4,461,927

[45] Date of Patent: Jul. 24, 1984

[54] AUTOMATIC DIALING AND ALARM SYSTEM

[76] Inventors: Ronald E. Olson, 3416 Oakhurst Dr.; William H. Windel, 3412 Oakhurst Dr., both of Burtonsville, Md. 20866; John M. Harrison, P.O. Box 1214, Concord, N.H. 03301

[21] Appl. No.: 471,645

[22] Filed: Mar. 3, 1983

[51] Int. Cl.³ .......................................... H04M 11/04
[52] U.S. Cl. ...................................... 179/2 A; 179/5 R
[58] Field of Search .................. 179/2 A, 2 AM, 5 R, 179/5 P, 90 BD, 90 B, 81 R

[56] References Cited

U.S. PATENT DOCUMENTS 2,550,076  4/1951  McCarron ........................ 179/5 R
3,801,971  4/1974  Stendig et al. ................. 179/5 R X
3,872,253  3/1975  Jurschak ............................ 179/5 R
3,989,900  11/1976  Dibner ............................ 179/5 R X Primary Examiner—A. D. Pellinen
Assistant Examiner—W. J. Brady
Attorney, Agent, or Firm—Sherman & Shalloway

[57] ABSTRACT

A system is disclosed which may readily be added to an existing system of phones and electrical outlets. It includes circuitry that, responsive to sensing of a condition, seizes a telephone line, dials a single digit and introduces a preferably beeping signal into the line to warn the switchboard operator of the sensed condition. The system repeats the cycle until the sensed condition ceases.

16 Claims, 3 Drawing Figures

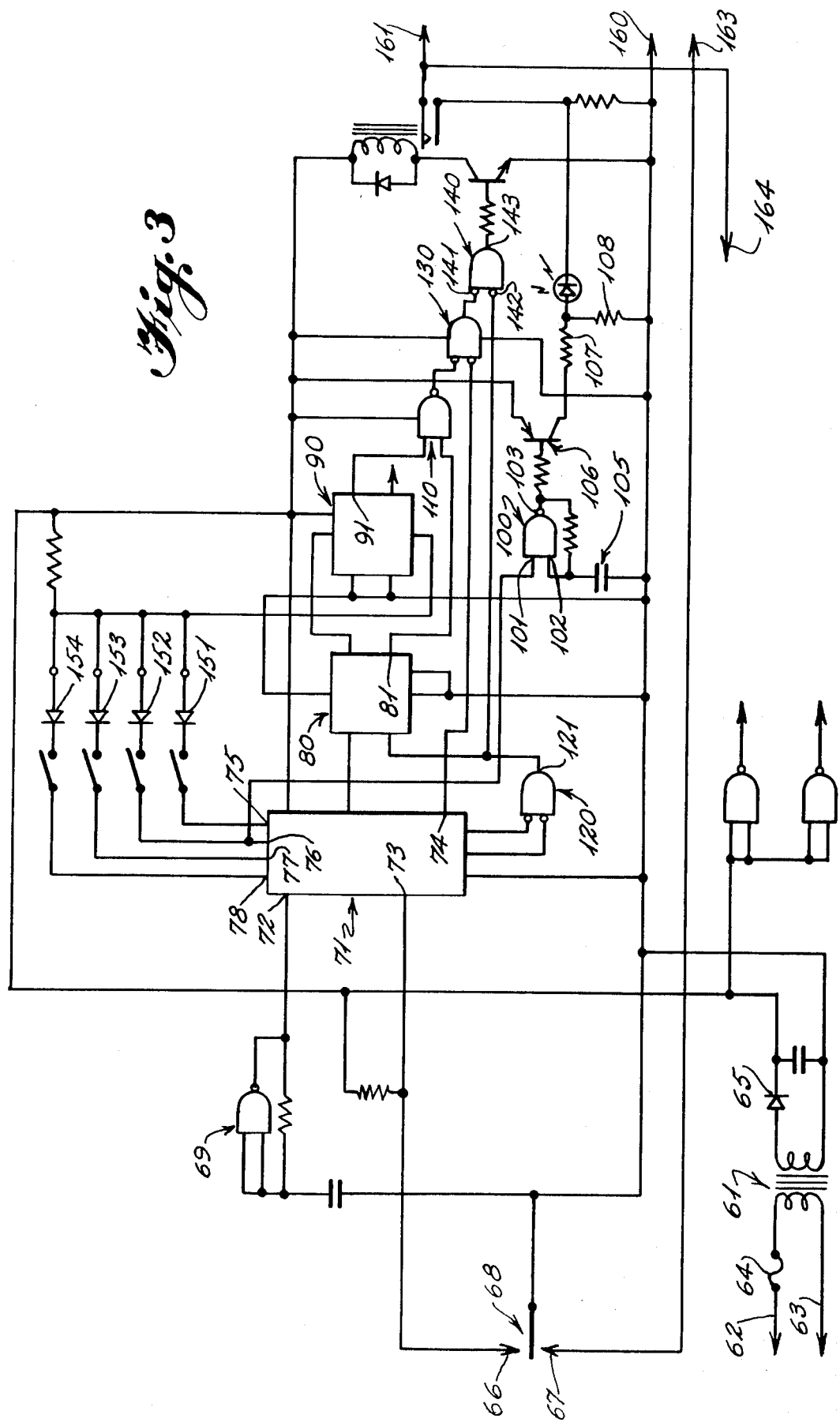

AUTOMATIC DIALING AND ALARM SYSTEM

BACKGROUND OF THE INVENTION

This invention relates to a detection and alarm system designed to sense a condition and responsive to that condition to seize a telephone line and notify a central switchboard area of the sensed condition.

An innovative system of this kind is clearly a pressing need especially in the hotel-motel industry as exemplified by recent fatal fires in Las Vegas, Nevada and elsewhere.

Prior systems of this general type have various shortcomings as exemplified by the following U.S. Patents:

1. McCarron, U.S. Pat. No. 2,550,076, upon sensing a condition such as a fire through sensor 50, initiates a dialing mechanism 10 connected in parallel with the phone lines 60, 70 which rings the central switchboard. The deficiencies in this system include the lack of means to seize a line in use, lack ot an audible alarm, and the requirement that the operator call the room for verification.

2. Stendig et al, 3,801,971 discloses an alarm system which has similar purposes as those in the instant disclosure but is usable only in a hotel with internal phone systems in which the operator dials all calls. Any sensation from the hotel room. whether it be lifting of the phone receiver, actuation of a fire or smoke detector, unplugging of the television or unauthorized entry of the room causes a light to actuate at the operator's station which blinks at various frequencies depending upon the condition sensed.

3. Jurschak, U.S. Pat. No. 3,872,253, discloses a system designed for connection to a telephone to automatically transmit information of the existence of an event to a distant location. The main disadvantage of this system is that it is designed only for use in one mode of telephone system state such as when the phone is "on the hook".

4. Dibner, U.S. Pat. No. 3,989,900, shows a system which signals an operator when, for example, the phone in a room has not been used in 24 hours. While the disclosure suggests other triggers such as "burglar or fire sensors" there is no specific disclosure of these details. A further problem is the ability to disarm the system at the phone with switch 13, a feature which could be fatal to a forgetful occupant.

The following patents are also known to applicants but are considered irrelevant to the teachings of the instant invention:
U.S. Pat. No. 1,109,616 to Clement
U.S. Pat. No. 2,525,697 to Lurie
U.S. Pat. No. 4,249,036 to Kutzki

SUMMARY OF THE INVENTION

The instant invention solves the problems attendant to the prior art by providing a system which combines in novel, useful and unobvious ways the following features:

(a) A sensing means is located in the room to be protected which senses the condition desired to be detected by the system. The condition to be sensed may include smoke or fire in the room, removal of an appliance plug from its wall receptable, unauthorized intrusion into the room, any other condition or any combination of these conditions.

(b) The heart of the system is a circuit board which reacts to sensing of the condition by creating a sequence of events including seizing control of the telephone line, placing the line in dialing condition, dialing a single digit to ring the operator (it is contemplated that the inventive system be used in conjunction with a large telephone system including direct outside dialing capability from each phone as well as ability to dial a single digit to reach the internal switchboard), generating a beeping tone (a continuous tone would also be suitable) audible to the switchboard operator when he or she answers the phone and repeating the cycle over a prescribed cycling time as long as the above described condition persists.

(c) The inventive system may be installed in any room or area which includes a telephone and 110-120 volt wiring.

(d) The inventive system is easy to install in existing buildings, cannot be disarmed by the occupant and the main circuitry of which is substantially invisible to the occupant.

BRIEF DESCRIPTION OF THE DRAWINGS

FIG. 3 is a schematic view of the circuitry of the switch module/dialer of FIGS. 1-2.

SPECIFIC DESCRIPTION OF THE PREFERRED EMBODIMENTS

Figure 1:
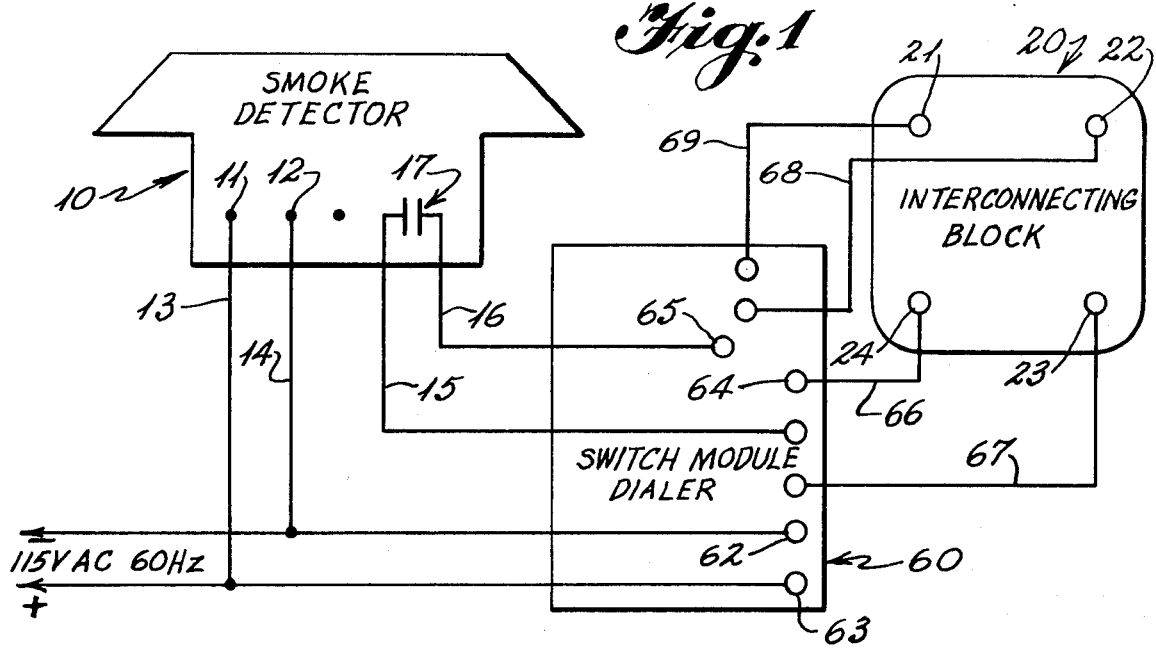
FIG. 1 is a schematic depiction of the system when used with a smoke detector as the input.

Referring to FIG. 1, a schematic depiction of a first embodiment of the invention is shown. Reference numeral 10 refers to a typical smoke detector used in this embodiment. An example of a suitable smoke detector is the Model 906 California Fire Marshal smoke detector, however, any smoke detector may be used which utilizes 110 volt circuitry input for its power and includes a relay connectable to external circuitry which closes (or opens as desired) when the smoke detector senses a fire and/or smoke condition. While the photoelectric type smoke detector is preferred because of its lack of radiation, an ionization type smoke detector will be compatable provided the above criteria are contained therewith. The smoke detector 10 includes terminals 11 and 12 which connect to the 110-120 volt A.C. 60 hz circuit in the area where the system is to be located with lines 13 and 14. Lines 13 and 14 also connect to the input terminals 62, 63 of a transformer 61 (FIG. 3) in the switch module/dialer 60 which steps the voltage down to 24 volts, the voltage used to power the switch module/dialer. Lines 15, 16 connect, in this example, a normally open relay 17 with the switch module/dialer 60 at points 64, 65 so that when the relay 17 closes upon detection of fire and/or smoke, this closure causes connection of lines 15, 16 to cause the switch module/dialer 60 to commence its cycle as explained below. Lines 66, 67, 68 and 69 are output lines which attach the switch module/dialer 60 to the telephone interconnecting block 20 which is normally located adjacent the telephone on a wall. The block 20 has terminals 21, 22, 23, 24 which may be connected with lines 66, 67, 68, 69 in a manner well known to those skilled in the art to either (1) only allow system operation when the telephone is "hung up" or (2) to allow system operation regardless of the status of the telephone.

Figure 2:
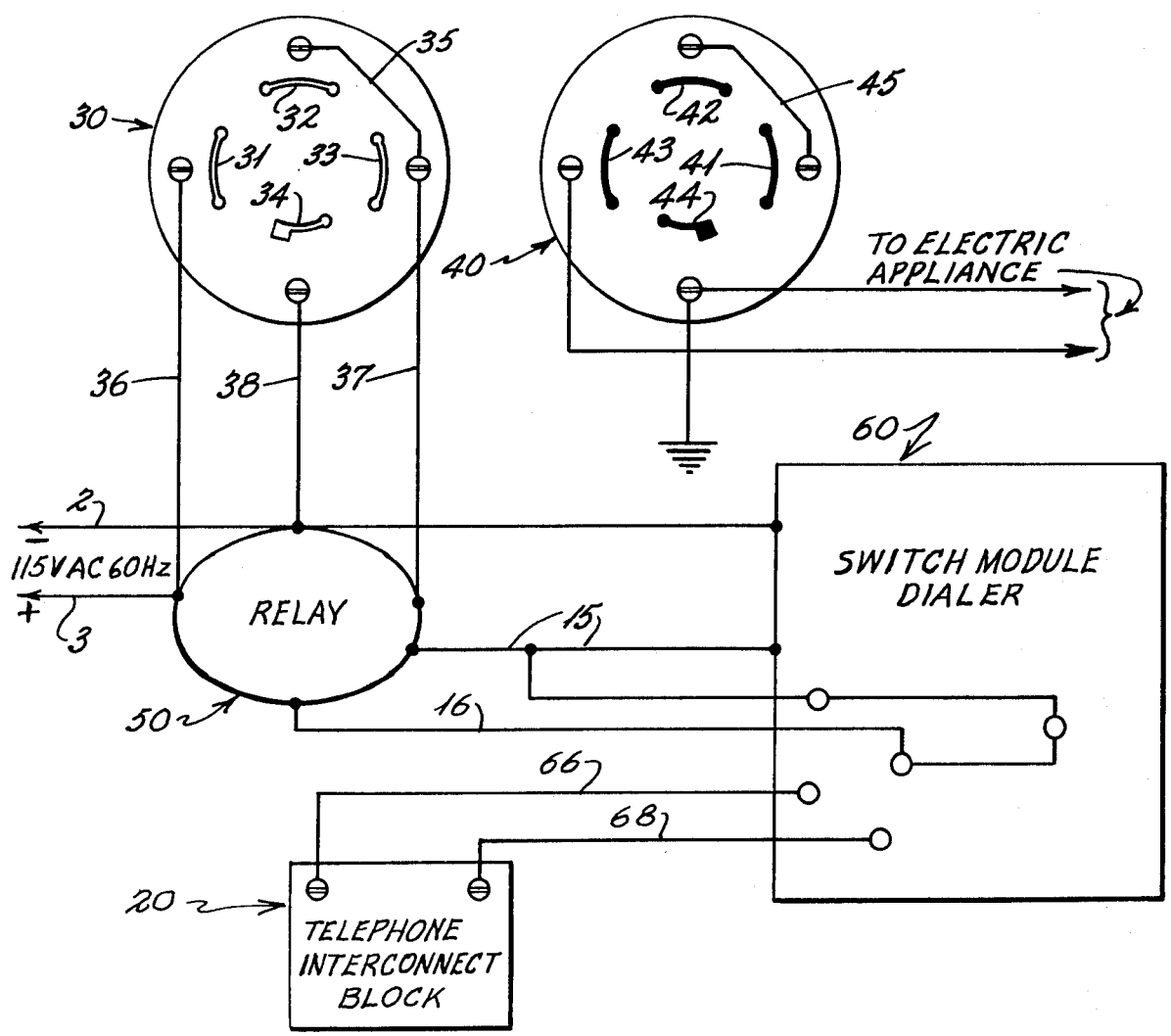
FIG. 2 is a schematic depiction similar to FIG. 1 but with a specially wired electrical outlet plug as the input.

Referring now to FIG. 2, a second embodiment of the invention is shown. In this embodiment, the input causing actuation of the circuit is the removal of an electrical plug 40 from its wall receptable 30. In the preferred design, the plug 40 is connected by standard electrical wire to a television set although any electrical appliance may be protected by this system. Receptacle 30 includes recessed sockets 31, 32, 33, 34 which mate with prongs 41, 42, 43, 44 respectively of plug 40. Jumper wire 35 connects sockets 32, 33 together whereas jumper wire 45 connects prongs 41, 42 together, the result being that as long as the plug 40 is secured in the socket 30, a connection will exist between sockets 31, 33 which are connected by wires 36, 37 with relay 50 while prongs 43, 44 receive voltage to operate the appliance. In the circuit, neutral line 2 connects through line 38 and socket 34 to prong 44 to the appliance whereas hot line 3 connects through line 36, socket 31, prong 41, jumers 45, 35, socket 33 and prong 43 to the appliance. In operation of this system, as long as the plug 40 is secured in the receptacle 30, the relay is held open by current in line 36 and the switch module/dialer is inactive. If, however, the plug 40 is removed from the receptacle 30, the relay closes which activates the dialing and alarm sequence.

Referring now to FIG. 3, the specific details of the switch module/dialer 60 will be discussed.

An 110 volt input 64 in the lower left hand corner goes to a diode to regulate voltage to the circuit 60. At the left hand side of the circuit are the contacts 66, 67 of a relay 68 normally open or closed to allow room telephone to operate normally. When the contacts close, the relay 68 disconnects the circuit to the room telephone and connects it instead to the alarm device. The circuit has a clock 69 and a counter 71; the clock 69 continuously provides signals to the pin 72 of counter 71 which counts clock pulses. Normally, when the circuit is in its idle state, pin 73 which is the reset of counter 71 is sitting at a positive supply voltage which causes the device to continuously reset and thus it does not count. When the alarm goes off, pin 73 becomes grounded which causes counter 71 to begin counting; this counting drives a chain of events which will result in hanging up the telephone towards the telephone-PBX, offhooking the telephone, dialing a single digit, supplying a beeping alarm signal and then repeating the above sequence. The counter 71 is an ordinary counter in which pin 74 divides by 2, pin 75 divides by 4, pin 76 divides by 8, etc.. The various signals coming out of the counter 71 are gated in the flip flops 80, 90 and from there to integrated circuits 100, 110 (Schmitt triggers) and 120, 130, 140 (gates) to form the various signals which are needed for the circuits. If we look at the output of gate 120, pin 121, for example, we see a signal which becomes a logical "through" for ¼ of the cycle. If we look at signal from flip-flop 90, pin 91, that signal is going to be gated together with the signal from flip-flop 80, pin 81—the combination of these 2 signals gives us a "window" during which dialing can occur. In other words, flip-flop 80 is set at the beginning of the number being dialed—flip-flop 90 is set according to the diodes 151, 152, 153, 154 when the appropriate digit has been dialed. So effectively, flip-flop 80 turns on, the dialing begins, flip-flop 90 turns on and the dialing ceases as to the pin 111 of gate 110. The actual dial pulses themselves come from terminal 74 of counter 71 as gated together at gate 130 to produce the pulses which are in fact the dial pulse digits, half the time on and half the time off. Gate 130 emits a dial pulse number to pulse the line toward the central office switchboard causing access of a certain given number. Gate 140 combines the dial pulse signal on pin 141 thereof and the signal from pin 121 of gate 120. The result is that the signal coming out of pin 143 of gate 140 begins its life by being "low" corresponding to the telephone being "on hook"; after about 12.8 seconds in the preferred design, the signal goes "high" causing the telephone to go "off hook", about 3.2 seconds thereafter in the preferred design, the dial pulses being allowed to come through pin 131 of gate 130 and the dialer dials a number as a 10 pulse per second rotary dialer would. While the preferred embodiment shows a pulsed type dialing circuit, the circuit could easily be adapted by one skilled in the art for emission of tone-type dialing sounds. The dialer dials pulsed digits into the telephone lines which buzzes the central office operator and accesses to a given level on a switch; the switch module/dialer then holds in that orientation for the remaining time left in a 51.2 second period which in the preferred design constitutes the length of one cycle. If, for example, the system dials 0 to access a PBX operator, the operator would pick up the circuit and listen and hear a tone. The tone comes through a different path. The tone is formed by a voltage coming into pin 101 of Schmitt trigger 100 so that when pin 101 is a "high" pin 103 because of the feedback through resistor 104 and capacitor 105 oscillates to form a tone at a very annoyable rate, for example, 1000 cps. This tone is caused to beep in an audible way by the voltage on pin 101. The output of pin 103 is amplified by transistor 106 and then goes through optional light emitting diode (not shown), attenuated by resistors 107 and 108, and then provided in series with the telephone line through leads 160 and 161 which connect to "tip" and "ring" of the telephone line.

Leads 160, 161 go in some configurations in parallel with the room telephone and in other configurations, leads 160, 161 go toward the telephone switching equipment, whereas lines 163 and 164 go toward the room telephone.

As stated above, the operation of the device is as follows: when a condition occurs which causes the relay 17 or 50 to close or open, as preferred, the switching module/dialer 60 seizes the telephone line, clears it, dials a single digit by either tone or pulse dialing, introduces a beeping tone into the telephone lines and continuously repeats this sequence as long as the condition persists.

A distinct advantage of the inventive system is its ready adaptability to existing systems. All that must be done is to tap off the room electrical circuitry to power up the system and connect to the room telephone wall interconnect block to allow system output access thereto. All electrical connections may be made hidden behind walls for esthetic satisfaction. While the system is designed specifically with hotel systems in mind, it may be used, with minor modification, if necessary, in any office type setting having a central switchboard with individual phones able to dial phone calls.

Since numerous designs will readily occur to those skilled in the art after consideration of the foregoing, the invention is not to be limited to what has been particularly disclosed herein, except as indicated in the following claims.

What is claimed:
1. An electrical circuit comprising:
 (a) first connection means for connecting said circuit to an electrical power source;

(b) second connection means for connecting said circuit to means sensing a condition;

(c) clock means for generating periodic signals in the form of clock pulses;

(d) counter means connected to said clock means for counting said clock pulses;

(e) reset means (i) associated with said counter means to substantially continuously reset said counter means whenever said condition is not sensed and (ii) associated with said means sensing a condition to disable said reset means whenever said condition is being sensed;

(f) dialing means responsive to said counter means to generate signals to dial a predetermined number;

(g) control means controlled by said counter means to control a time period during which said dialing means is operative;

(h) tone generating means which generates a tone signal after said control means has ended said time period; and (i) third connection means for connecting the signals generated by said dialing means and said tone generating means with a telephone signal line.

2. The circuit of claim 1 wherein said electrical power source comprises a 110 to 120 volt 60 cycle source of electrical power.

3. The circuit of claim 2 and further including transformer means connected to said electrical power source to step down the voltage supplied to said circuit.

4. The circuit of claim 1 wherein said means sensing a condition includes a smoke detector which senses smoke or fire.

5. The circuit of claim 4 wherein said means sensing a condition further includes a normally open relay connected between said smoke detector and said second connection means, said normally open relay closing upon said sensing of said condition.

6. The circuit of claim 5, wherein the closing of said relay causes said reset means to be grounded thereby rendering operative signals from said counter means which control said dialing means and said tone generating means.

7. The circuit of claim 1 wherein said means sensing a condition includes an electrical plug attached to an electrical appliance and a receptacle connected to an electrical power supply.

8. The circuit of claim 7 wherein said electrical appliance is a television set.

9. The circuit of claim 7 wherein said means sensing a condition further includes a relay (i) which is held open as long as said plug and receptacle are interconnected, and (ii) which responsive to removal of said plug from said receptacle closes.

10. The circuit of claim 9 wherein the closing of said relay causes said reset means to be grounded thereby rendering operative signals from said counter means which control said dialing means and said tone generating means.

11. The circuit of claim 1 wherein said dialing means comprises pulsed dialing means.

12. The circuit of claim 4 wherein said smoke detector is a thermoelectric type smoke detector.

13. The circuit of claim 4 wherein said smoke detector is an ionic type smoke detector.

14. The circuit of claim 1 wherein said control means includes first and second flip-flop means which define the beginning and ending respectively of said time period.

15. The circuit of claim 1 wherein said counter means repeats actuation of said dialing means and said tone generating means cyclically as long as said condition is sensed.

16. The circuit of claim 1 wherein said tone generating means includes a Schmitt trigger.

* * * * *